(12) United States Patent
Fujiwara et al.

(10) Patent No.: US 7,618,909 B2
(45) Date of Patent: Nov. 17, 2009

(54) PRECISION PRESS-MOLDING PREFORM, PROCESS FOR THE PRODUCTION THEREOF, OPTICAL ELEMENT AND PROCESS FOR THE PRODUCTION OF THE OPTICAL ELEMENT

(75) Inventors: Yasuhiro Fujiwara, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/078,556

(22) Filed: Apr. 1, 2008

(65) Prior Publication Data

US 2008/0187737 A1  Aug. 7, 2008

Related U.S. Application Data

(63) Continuation of application No. 10/929,726, filed on Aug. 31, 2004, now abandoned.

(30) Foreign Application Priority Data

Sep. 4, 2003  (JP) ............................. 2003-312576

(51) Int. Cl.
  *C03C 3/16* (2006.01)
  *C03C 3/19* (2006.01)
  *C03C 3/17* (2006.01)

(52) U.S. Cl. ............................. 501/45; 501/46; 501/47; 501/48

(58) Field of Classification Search ................ 501/45, 501/46, 47, 48
See application file for complete search history.

(56) References Cited

U.S. PATENT DOCUMENTS

| 4,202,700 A | 5/1980 | Wilder, Jr. |
| 4,455,384 A | 6/1984 | Day et al. |
| 4,615,989 A | 10/1986 | Ritze |
| 4,940,677 A | 7/1990 | Beall et al. |
| 5,071,795 A | 12/1991 | Beall et al. |
| 5,153,151 A | 10/1992 | Aitken |
| 5,234,871 A | 8/1993 | Krashkevich |
| 5,256,604 A | 10/1993 | Aitken |
| 5,286,683 A | 2/1994 | Aitken |
| 5,330,940 A | 7/1994 | Aitken |
| 5,529,961 A | 6/1996 | Aitken et al. |
| 5,668,066 A | 9/1997 | Oguma et al. |
| 6,093,484 A | 7/2000 | Oguma |
| 6,225,244 B1 | 5/2001 | Oguma |
| 7,157,391 B2 | 1/2007 | Kasuga et al. |
| 2004/0138043 A1 | 7/2004 | Kasuga et al. |

FOREIGN PATENT DOCUMENTS

| JP | 55-121924 | 9/1980 |
| JP | 57-149845 | 9/1982 |
| JP | 60-122749 | 7/1985 |
| JP | 4-104918 | 4/1992 |
| JP | 07/267673 | 10/1995 |
| JP | 11-268927 | 10/1999 |

*Primary Examiner*—Karl E Group
*Assistant Examiner*—Elizabeth A Bolden
(74) *Attorney, Agent, or Firm*—Nixon & Vanderhye P.C.

(57) ABSTRACT

A precision press-molding preform for producing an optical element for use in an imaging device using a CCD type or MOS type solid image-sensing device, which is formed of a glass composition containing, by mol %, 25 to 45% of $P_2O_5$, 0.5 to 10% of CuO, 0 to 10% of $B_2O_3$, 0 to 10% of $Al_2O_3$, 2 to 30% of $Li_2O$, 0 to 25% of $Na_2O$, 0 to 15% of $K_2O$, the total content of $Li_2O$, $Na_2O$ and $K_2O$ being 3 to 40%, 3 to 45% of BaO, 0 to 30% of ZnO, 0 to 20% of MgO, 0 to 20% of CaO, 0 to 20% of SrO, 0 to 10% of $Bi_2O_3$, 0 to 5% of $La_2O_3$, 0 to 5% of $Gd_2O_3$ and 0 to 5% of $Y_2O_3$, the total content of these components being at least 98%, and a precision press-molding preform, which is formed of a phosphate glass containing CuO, an alkali metal oxide, BaO and ZnO and having a BaO content/ZnO content molar ratio (BaO/ZnO) of greater than 1.

13 Claims, 3 Drawing Sheets

PRECISION PRESS-MOLDING PREFORM, PROCESS FOR THE PRODUCTION THEREOF, OPTICAL ELEMENT AND PROCESS FOR THE PRODUCTION OF THE OPTICAL ELEMENT

CROSS REFERENCE TO RELATED APPLICATIONS

This application is a continuation of application Ser. No. 10/929,726 filed Aug. 31, 2004, now abandoned, which in turn claims priority of Japanese application Ser. No. 2003-312576 filed Sep. 4, 2003, the entire contents of each of which is hereby incorporated by reference.

FIELD OF THE INVENTION

The present invention relates to a precision press-molding preform (a preform for precision press-molding) and a process for the production thereof and also relates to an optical element and a process for the production thereof. More specifically, the present invention relates to a precision press-molding preform, the preform being formed of a phosphate glass and being for an optical element to be encased in an imaging device of a color VTR or digital camera using a solid image sensing device of a CCD (Charge-Coupled Device) type or MOS (Metal-Oxide-Semiconductor) type, and a process for the production thereof. And, it also relates to various optical elements formed from such preforms by precision press-molding, particularly, an optical element having a near infrared absorbing function, and a process for the production thereof.

TECHNICAL BACKGROUND

Conventionally, most of imaging devices of digital cameras and digital VTR cameras use CCD and MOS solid image-sensing devices. The optical system of such an image-sensing device requires a filter optical element capable of cutting near infrared light. In solid image-sensing devices, generally, the spectral sensitivity, for example, of CCD extends from a visible light region to the vicinity of 1,000 nm in a near infrared light region, so that it is required to cut near infrared light for matching the spectral sensitivity received through CCD to the counterpart of human eyes. Otherwise, an image obtained comes to be reddish, and no excellent image reproduction can be attained. For this purpose, filter glasses for cutting near infrared light have been developed and widely employed. For example, JP-A-4-104918 discloses a phosphate glass and a fluorophosphate glass.

Meanwhile, as imaging devices are downsized in recent years, it is strongly demanded to downsize image-sensing optical systems. For coping with the downsizing, it is sufficient to decrease the number of parts by using an optical element having a plurality of optical functions. For example, a thinkable solution is to impart one optical element with the above near infrared light cutting function and the function of an optical low-pass filter that passes light having a low spatial modulation frequency, or to impart one optical element with the near infrared light cutting function and a lens function.

Concerning lens functions as well, when the optical element is an aspherical lens, excellent optical performances can be obtained while using fewer parts as compared with an optical system using a spherical lens alone.

However, the above low-pass filter and the above aspherical lens have a problem that they cannot be produced highly productively when an infrared-light-absorbing glass is mechanically processed. For overcoming this problem, a near-infrared-absorbing glass can be precision-press molded to produce an optical element having the above multi-functions.

Since, however, a conventional near-infrared-absorbing glass contains arsenic, a large amount of $P_2O_5$ or fluorine for attaining a high transmittance at and around 400 nm, such a glass is not suitable as a glass for precision press-molding.

Arsenic involves environmental problems due to its toxicity. Further, it exhibits very high oxidizability, so that it may damage the molding surface of a press mold used for the precision press-molding and may make it impossible to use the mold repeatedly.

Further, a glass containing a large amount of $P_2O_5$ has a problem that such a glass is poor in climate resistance. When precision press-molding preforms are produced from such a glass and stored, the surface state of the preforms is deteriorated, and the preforms are no longer suitable as materials for producing optical elements by precision press-molding.

The introduction of fluorine gives a glass having a lower melting point and having an excellent transmittance. However, this glass has the following problem. Since fluorine volatilizes when the glass is melted, it is difficult to stably produce preforms one by one from the glass in a molten state, and such a glass is not suitable for the precision press-molding. Therefore, no optical element has been put to practical use that is produced from a glass described in the above JP-A-4-104981.

DISCLOSURE OF THE INVENTION

It is an object of the present invention to provide a precision press-molding preform, which overcomes the above defects of conventional glasses, which is excellent in precision press-moldability and durability and which enables the stable production of an optical element having an excellent near infrared absorbing function, etc., and a process for the production thereof, and it is also another object of the present invention to provide an optical element obtained from the above preform by precision press-molding and a process for the production of the optical element.

The present inventors have conducted a variety of experiments for overcoming the above problems. As a result, it has been found that when an alkali component and BaO are introduced into a $P_2O_5$-containing glass, the melting point of the $P_2O_5$-containing glass can be decreased, and the $P_2O_5$-containing glass can be imparted with excellent near infrared absorption properties and sufficiently high climate resistance, so that a glass composition suitable for precision press-molding can be obtained. On the basis of this finding, the present invention has been completed.

That is, the present invention provides;

(1) a precision press-molding preform, which is formed of a glass composition comprising, by mol %, 25 to 45% of $P_2O_5$, 0.5 to 10% of CuO, 0 to 10% of $B_2O_3$, 0 to 10% of $Al_2O_3$, 2 to 30% of $Li_2O$, 0 to 25% of $Na_2O$, 0 to 15% of $K_2O$, the total content of $Li_2O$, $Na_2O$ and $K_2O$ being 3 to 40%, 3 to 45% of BaO, 0 to 30% of ZnO, 0 to 20% of MgO, 0 to 20% of CaO, 0 to 20% of SrO, 0 to 10% of $Bi_2O_3$, 0 to 5% of $La_2O_3$, 0 to 5% of $Gd_2O_3$ and 0 to 5% of $Y_2O_3$, the total content of these components being at least 98%, (2) a precision press-molding preform as recited in the above (1), wherein the glass composition has a BaO content/ZnO content molar ratio (BaO/ZnO) of greater than 1, (3) a precision press-molding preform, which is formed of a phosphate glass containing CuO, an alkali metal oxide, BaO and ZnO and having a BaO content/ZnO content molar ratio (BaO/ZnO) of greater than 1, (4) a precision press-molding preform as recited in the above (3), wherein the phosphate glass contains, by mol %, 25 to 45% of $P_2O_5$, 0.5 to 10% of cuO, 0 to 10% of $B_2O_3$, 0 to 10% of $Al_2O_3$, 3 to 40% of a total of $Li_2O$, $Na_2O$ and $K_2O$, 3 to 45% of BaO and 0 to 30% of ZnO, (5) a precision press-molding preform as recited in the above (1) or (3), wherein the glass, when it has a thickness of 1 mm, has, as transmittance characteristics, an external transmittance of 80 to 90% at a wavelength of 400 nm, an external transmittance of 0.1 to 18% at a wavelength of 700 nm, an external transmittance of 1 to 30% at a wavelength of 1,200 nm and a maximum external transmittance at a wavelength of 400 to 600 nm, (6) a process for the production of a precision press-molding preform, which comprises separating a molten glass gob having a predetermined mass from a molten glass and shaping the molten glass gob into the precision press-molding preform recited in the above (1) or (3), (7) an optical element which is a precision press-molded product from the precision press-molding preform recited in the above (1) or (3), (8) an optical element which is a precision press-molded product from that precision press-molding preform which is produced by the process recited in the above (6), (9) an optical element which is a precision press-molded product and is formed of a glass composition comprising, by mol %, 25 to 45% of $P_2O_5$, 0.5 to 10% of CuO, 0 to 10% of $B_2O_3$, 0 to 10% of $Al_2O_3$, 2 to 30% of $Li_2O$, 0 to 25% of $Na_2O$, 0 to 15% of $K_2O$, the total content of $Li_2O$, $Na_2O$ and $K_2O$ being 3 to 40%, 3 to 45% of BaO, 0 to 30% of ZnO, 0 to 20% of MgO, 0 to 20% of CaO, 0 to 20% of SrO, 0 to 10% of $Bi_2O_3$, 0 to 5% of $La_2O_3$, 0 to 5% of $Gd_2O_3$ and 0 to 5% of $Y_2O_3$, the total content of these components being at least 98%, (10) an optical element which is a precision press-molded product and is formed of a phosphate glass containing CuO, an alkali metal oxide, BaO and ZnO and having a BaO content/ZnO content molar ratio (BaO/ZnO) of greater than 1, (11) an optical element as recited in the above (7), which is one of an aspherical lens, a spherical lens, a lens array, an optical low-pass filter and a diffraction grating, and has a near infrared absorbing function, (12) a process for the production of an optical element, which comprises heating the precision press-molding preform recited in the above (1) or (3) and precision press-molding the preform by means of a press mold, (13) a process for the production of an optical element, which comprises heating that precision press-molding preform produced by the process recited in the above (6) and precision press-molding the preform by means of a press mold, (14) a process for the production of an optical element as recited in the above (12), wherein the precision press-molding preform is introduced into the press mold, and the preform and the press mold are heated together for the precision press-molding, and (15) a process for the production of an optical element as recited in the above (12), wherein the precision press-molding preform is pre-heated and then introduced into the press mold for precision press-molding.

EFFECT OF THE INVENTION

According to the present invention, there can be provided a precision press-molding preform which is excellent in precision press-moldability and durability and which enables the stable production of an optical element having an excellent near infrared absorbing function, etc., and a process for the production thereof.

According to the present invention, further, there can be provided an optical element that is a precision press-molded product from the above preform and a process for the production of the optical element.

There can be therefore obtained various optical elements such as an aspherical lens, a spherical lens, a lens array, etc., which have a near infrared light absorbing function, etc., so that the optical system of a solid image-sensing device can be constituted of fewer parts, which is effective for downsizing and weight-decreasing of imaging devices. Further, since the above optical elements can be produced by precision press-molding, there can produced optical elements such as an aspherical lens, a lens array, a lens with an optical low-pass filter, a microlens, etc., easily and at a low cost, which require labors and a cost when produced by processing with a machine.

PREFERRED EMBODIMENTS OF THE INVENTION

First, the precision press-molding preform (the preform for precision press-molding) and the process for the production thereof will be explained below.

[Precision Press-Molding Preform and Process for the Production Thereof]

The precision press-molding preform, provided by the present invention, includes two embodiments, a preform I and a preform II.

(Preform I)

The first precision press-molding preform (preform I), provided by the present invention, is formed of a glass having a composition comprising, by mol %, 25 to 45% of $P_2O_5$, 0.5 to 10% of CuO, 0 to 10% of $B_2O_3$, 0 to 10% of $Al_2O_3$, 2 to 30% of $Li_2O$, 0 to 25% of $Na_2O$, 0 to 15% of $K_2O$, the total content of $Li_2O$, $Na_2O$ and $K_2O$ being 3 to 40%, 3 to 45% of BaO, 0 to 30% of ZnO, 0 to 20% of MgO, 0 to 20% of CaO, 0 to 20% of SrO, 0 to 10% of $Bi_2O_3$, 0 to 5% of $La_2O_3$, 0 to 5% of $Gd_2O_3$ and 0 to 5% of $Y_2O_3$, the total content of these components being at least 98%, Contents of glass components to be described hereinafter represent contents by mol % unless otherwise specified.

Reasons for limitations of the contents of the glass components will be explained as below.

$P_2O_5$ is a main component to constitute the network structure of the glass and is essential for stable operations and formation of the glass. When the content thereof is less than 25%, the glass is degraded in thermal stability and is also degraded in climate resistance. When it exceeds 45%, the viscosity of a molten glass increases, so that it is difficult to introduce optional components to be explained later, such as $Bi_2O_3$, $Nb_2O_5$ and $WO_3$. Further, it may not be possible to carry out the procedure of hot preform shaping in which a molten glass gob having a mass equivalent to one preform is separated from a molten glass and shaped into a preform before the glass is cooled. The content of $P_2O_5$ is therefore limited to 25 to 45%, and it is preferably in the range of 27 to 42%. The content of $P_2O_5$ by mass % is preferably less than 65 mass %, more preferably 60 mass % or less, still more preferably 59 mass % or less.

CuO is an essential component that works as a main component for imparting the above glass with the property of absorbing near infrared light. When the content of CuO is less than 0.5%, there may be obtained no sufficient property of absorbing near infrared light. When it exceeds 10%, the glass may be degraded in devitrification resistance. The content thereof is therefore limited to 0.5 to 10%.

$B_2O_3$ is a component having the effect of improving the glass in climate resistance when added in a small amount and attaining low-dispersion of optical properties of the glass. When the content thereof exceeds 10%, the glass transition temperature greatly increases, and the durability thereof is greatly degraded. The content of $B_2O_3$ is therefore limited to 0 to 10%. The content thereof is preferably 8% or less, more preferably over 0% but not more than 8%. The content of $B_2O_3$ by mass % is more preferably 3 mass % or less, particularly preferably 2.5 mass % or less.

$Al_2O_3$ has the effect of improving the glass in climate resistance and water resistance when added in a small amount. However, it may increase the melting temperature, may promote the reducing reaction of $Cu^{2+} \rightarrow Cu^+$ and may attenuate the transmittance of the glass and the property of the glass absorbing near infrared light. The content of $Al_2O_3$ is therefore limited to 0 to 10%. It is preferably 0 to 6%, still more preferably over 0% but not more than 6%. The content of $Al_2O_3$ by mass % is more preferably less than 10 mass %, particularly preferably 9 mass % or less.

In the above glass composition, it is remarkably effective to incorporate at least $Li_2O$ as an alkali metal oxide. The reason therefor is that $Li_2O$ is a component effective for decreasing the melting point and softening temperature of the glass. For this purpose, at least 2% of $Li_2O$ is incorporated. When the content thereof exceeds 30%, however, the glass increasingly tends to devitrify and the liquidus temperature of the glass may increase, so that the content of $Li_2O$ is limited to the range of 2 to 30%. The content thereof is preferably in the range of 5 to 25%.

For alleviating the devitrification tendency when $Li_2O$ alone is incorporated as an alkali metal oxide $R_2O$, it is preferred to incorporate at least one member selected from $Na_2O$ or $K_2O$.

The content of $Na_2O$ is in the range of 0 to 25%, preferably 0 to 20%, more preferably over 0% but not more than 20%. The content of $K_2O$ is in the range of 0 to 15%, preferably 0 to 10%, more preferably over 0% but not more than 10%. The reason therefor is that when the content of $Na_2O$ exceeds 25%, the glass is degraded in durability and stability and that when the content of $K_2O$ exceeds 15%, it is difficult to impart the glass with a low melting point.

$R_2O$ (R=Li, Na or K) is an essential component that has the effect of decreasing the glass transition temperature and the liquid-phase viscosity of the glass and that imparts the glass with thermal properties required for shaping a precision press-molding preform. When a large amount of an alkali is incorporated, there is produced an effect that the reduction of near infrared light-absorbing $Cu^{2+}$ into $Cu^+$ ($Cu^{2+} \rightarrow Cu^+$) is suppressed. When the content of $R_2O$ is less than 3%, the effect of suppressing the reducing reaction of $Cu^{2+} \rightarrow Cu^+$ is attenuated, the glass transition temperature increases, and the viscosity of a molten glass during hot preform shaping increases, so that there are caused difficulties in press-molding and hot preform shaping. When the total content of these components exceeds 40%, the glass is degraded in climate resistance and thermal stability. The total content of these components is therefore limited to 3 to 40%. The total content thereof is preferably in the range of 5 to 36%, more preferably over 5% but not more than 36%.

BaO is a component for modifying the glass and is used for adjusting various properties of the glass. Further, BaO has the effect of improving the glass in climate resistance, so that it is an essential component in the above glass composition. When the content thereof exceeds 45%, it is no longer possible to obtain a low-temperature softening property, and the liquidus temperature of the glass may increase. When it is less than 3%, the desired durability and climate resistance can be no longer obtained, and the glass is very easily devitrified. The content of BaO is therefore limited to 3 to 45%, and it is preferably in the range of 5 to 40%. The content of BaO by mass % is more preferably at least 8.5 mass %, still more preferably at least 11 mass %, yet more preferably at least 13 mass %, particularly preferably at least 20.5 mass %.

Like BaO, ZnO is a component for modifying the glass and is used for adjusting various properties of the glass. Particularly, ZnO greatly contributes to a lower melting point of the glass. When the content of ZnO exceeds 30%, ZnO causes the thermal stability of the glass to decrease or causes the liquid-phase viscosity of the glass to increase, so that the thermal properties that the glass suitable as a glass for forming a precision press-molding preform is required to have are completely impaired. The content of ZnO is therefore limited to 0 to 30%. The content thereof is preferably 0 to 25%, more preferably over 0% but not more than 25%. The content of ZnO by mass % is more preferably less than 20 mass %, particularly preferably 16 mass % or less.

For improving the climate resistance of the preform and an optical element to be obtained, preferably, the molar ratio of the content of BaO to the content of ZnO (BaO/ZnO) is adjusted to a value of greater than 1.

MgO, CaO and SrO are components to be used for adjusting the durability and stability of the glass. When the content of each of these components exceeds 20%, it may be no longer possible to incorporate BaO that is incorporated for imparting the glass with climate resistance, so that the content of each of these components is limited to 0 to 20%. The content of each component is preferably 0 to 15%.

$Bi_2O_3$ is an optional component. When $Bi_2O_3$ is incorporated in a small amount, however, it is capable of not only improving the glass in stability but also suppressing the reducing reaction of $Cu^{2+} \rightarrow Cu^+$. Particularly, when the content of $P_2O_5$ is relatively large, the incorporation of $Bi_2O_3$ is very effective. When a large amount of $Bi_2O_3$ is incorporated, however, the absorption in a near infrared light region increases, and the transmittance at a wavelength of 400 nm may therefore decrease. The content of $Bi_2O_3$ is therefore limited to 0 to 10%. It is preferably in the range of 0.1 to 10%, more preferably 0.1 to 5%.

$La_2O_3$, $Gd_2O_3$ and $Y_2O_3$ are components that have the effect of improving the glass in climate resistance and that can be incorporated as required. However, when the content of each component exceeds 5%, it is difficult to obtain the desired low-temperature softening property, and the liquid-phase viscosity of the glass is liable to increase. The content of each of the above components is therefore limited to 0 to 5%. Preferably, the content of each component is 0 to 4%.

In the above glass composition, for imparting the glass with the above desired properties, the total content of the above components is required to be at least 98%, and it is preferably over 98%, more preferably at least 99%, still more preferably 100%.

In addition to the above components, 0 to 2% of $Yb_2O_3$ may be incorporated, or 0 to 2% of $Lu_2O_3$ may be incorporated, for improving the glass in climate resistance. Further, 0 to 2% of $CeO_2$ may be incorporated as well.

For adjusting the optical properties of the glass, $Nb_2O_5$ and $WO_3$ may be incorporated in an amount of 0 to 2% each.

Further, when $GeO_2$, $SnO$ and $Fe_2O_3$ are incorporated in such a small amount that the glass properties are not impaired, they have the effect of suppressing the reducing reaction of $Cu^{2+} \rightarrow Cu^+$. When each of these components is incorporated in an amount of over 2%, they promote a reaction between a melting platinum crucible and the glass, and the transmittance at 400 nm may be therefore possibly degraded. Therefore, it is preferred to control the total content of these components so that it is 2% or less, it is more preferred to control the above total content so that it is less than 0.1 mass %, and it is still more preferred to control the above total content so that it is 0.01 mass % or less. When components in such a trace amount are incorporated, these trace components need to be uniformly mixed in the entire raw material, so that it is difficult to formulate such a glass, and that it is difficult to melt a glass having a constant composition. Further, $GeO_2$ is an expensive material, and desirably, none of $GeO_2$, $SnO$ and $Fe_2O_3$ is incorporated when priority is given to a cost and the formulation problem.

In addition to the above components, $Sb_2O_3$ may be incorporated as a refining agent. In the case, the content of $Sb_2O_3$ based on the total content of the glass composition excluding $Sb_2O_3$ is preferably 0 to less than 1 mass %, more preferably 0 to 0.9 mass %. The content of $Sb_2O_3$ by mol % is preferably 0 to 1 mol %, more preferably 0 to 0.9 mol %.

Desirably, the above glass contains none of $PbO$, $As_2O_3$ and fluorine. The reason therefor is as already explained.

Further, Tl, Cd and Cr which are toxic should be precluded, and it is also preferred to preclude an Ag oxide that may be reduced to precipitate as a metal during precision press-molding in a non-oxidizing atmosphere.

The above glass composition particularly preferably has a co-presence of $P_2O_5$, $CuO$, $B_2O_3$, $Al_2O_3$, $Li_2O$, $Na_2O$, $K_2O$, $BaO$ and $ZnO$, and a glass composition in which the total content of these components is 100% is the most preferred.

A glass composition having a more preferred compositional range from the above viewpoints can be obtained by combining the preferred content ranges of the above components as required. One embodiment of such a more preferred glass composition specifically contains 27 to 42% of $P_2O_5$, 0.5 to 10% of $CuO$, over 0% but not more than 8% of $B_2O_3$, over 0% but not more than 6% of $Al_2O_3$, 5 to 25% of $Li_2O$, over 0% but not more than 20% of $Na_2O$, over 0% but not more than 10% of $K_2O$, the total content of $Li_2O$, $Na_2O$ and $K_2O$ being over 5% but not more than 36%, 5 to 40% of $BaO$, over 0% but not more than 25% of $ZnO$, the $BaO$ content/$ZnO$ content molar ratio being greater than 1 (($BaO/ZnO$)>1), 0 to 15% of $MgO$, 0 to 15% of $CaO$, 0 to 15% of $SrO$, 0 to 10% of $Bi_2O_3$, 0 to 4% of $La_2O_3$, 0 to 4% of $Gd_2O_3$ and 0 to 4% of $Y_2O_3$, the total content of these components being at least 98%. Another embodiment of the above preferred glass composition specifically contains 27 to 42% of $P_2O_5$, 0.5 to 10% of $CuO$, over 0% but not more than 8% of $B_2O_3$, over 0% but not more than 6% of $Al_2O_3$, 5 to 25% of $Li_2O$, over 0% but not more than 20% of $Na_2O$, over 0% but not more than 10% of $K_2O$, the total content of $Li_2O$, $Na_2O$ and $K_2O$ being over 5% but not more than 36%, 5 to 40% of $BaO$, over 0% but not more than 25% of $ZnO$, 0 to 15% of $MgO$, 0 to 15% of $CaO$, 0 to 15% of $SrO$, 0.1 to 10% of $Bi_2O_3$, 0 to 4% of $La_2O_3$, 0 to 4% of $Gd_2O_3$ and 0 to 4% of $Y_2O_3$, the total content of these component being at least 98%.

(Preform II)

The second precision press-molding preform (preform II), provided by the present invention, is formed of a phosphate glass containing CuO, an alkali metal oxide, BaO and ZnO and having a BaO content/ZnO content molar ratio (BaO/ZnO) of greater than 1.

In the preform II, $P_2O_5$, CuO, an alkali metal oxide, BaO and ZnO exhibit the same activities and effects as those in the above preform I. As explained already, a precision press-molding preform is desirably formed of a glass that is imparted with a low-temperature softening property and has sufficient climate resistance. For this purpose, the molar ratio of the content of BaO to the content of ZnO (BaO/ZnO) in the preform II is determined to be greater than 1.

As an alkali metal oxide, it is preferred to incorporate $Li_2O$, it is more preferred to incorporate $Li_2O$ and $Na_2O$. Desirably, $Li_2O$, $Na_2O$ and $K_2O$ are incorporated, and these components are adjusted such that the total content thereof is equivalent to the content of the alkali metal oxide.

Like the preform I, further, it is preferred to incorporate $B_2O_3$ or incorporate $Al_2O_3$.

In the preform II, similarly, the content of $P_2O_5$ is preferably in the range of 25 to 45%, more preferably 27 to 42%. The content of $P_2O_5$ by mass % is more preferably 65 mass % or less, still more preferably 60 mass % or less, yet more preferably 59 mass % or less.

Like the preform I, similarly, the content of CuO is preferably 0.5 to 10%.

Like the preform I, similarly, the content of $B_2O_3$ is preferably 0 to 10%. The content thereof is more preferably 8% or less, still more preferably over 0% but not more than 8%. The content of $B_2O_3$ by mass % is more preferably less than 3 mass %, particularly preferably 2.5 mass % or less.

Like the preform I, similarly, the content of $Al_2O_3$ is preferably 0 to 10%. The content thereof is more preferably 0 to 6%, still more preferably over 0% but not more than 6%. The content of $Al_2O_3$ by mass % is more preferably less than 10 mass %, particularly preferably 9 mass % or less.

Like the preform I, similarly, the total content of $Li_2O$, $Na_2O$ and $K_2O$ is preferably 3 to 40%. The content thereof is more preferably in the range of 5 to 36%, still more preferably over 5 but not more than 36%.

Like the preform I, similarly, the content of $Li_2O$ is preferably in the range of 2 to 30%, particularly preferably 5 to 25%.

Like the preform I, similarly, the content of $Na_2O$ is preferably 0 to 25%. The content thereof is more preferably in the range of 0 to 20%, still more preferably over 0% but not more than 20%.

Like the preform I, similarly, the content of $K_2O$ is preferably in the range of 0 to 15%, more preferably 0 to 10%, still more preferably over 0% but not more than 10%.

Like the preform I, similarly, the content of BaO is preferably in the range of 3 to 45%, more preferably 5 to 40%. The content of BaO by mass % is preferably 8.5 mass % or more, more preferably 11 mass % or more, still more preferably 13 mass % or more, particularly preferably 20.5 mass % or more.

Like the preform I, similarly, the content of ZnO is preferably 0 to 30%. The content thereof is more preferably 0 to 25%, still more preferably over 0% but not more than 25%. The content of ZnO by mass % is more preferably 20 mass % or less, particularly preferably 16 mass % or less.

A glass composition having a more preferred compositional range from the above viewpoints can be obtained by combining the preferred content ranges of the above components as required. One embodiment of such a more preferred glass composition specifically contains 25 to 45% of $P_2O_5$, 0.5 to 10% of CuO, 0 to 10% of $B_2O_3$, 0 to 10% of $Al_2O_3$, 3 to 40% of a total of $Li_2O$, $Na_2O$ and $K_2O$, 3 to 45% of BaO and 0 to 30% of ZnO.

In the preform II, the above glass composition particularly preferably has a co-presence of $P_2O_5$, CuO, $B_2O_3$, $Al_2O_3$, $Li_2O$, $Na_2O$, $K_2O$, BaO and ZnO as well, and a glass composition in which the total content of these components is 100% is the most preferred.

In the preform II, $Sb_2O_3$ may be incorporated as a refining agent as well. In this case, the content thereof is preferably as discussed in the preform I. Further, preferably, the above glass contains none of PbO, $As_2O_3$, fluorine, Tl, Cd, Cr and an Ag compound for the same reasons as those explained with regard to the preform I.

(Points Common to preforms I and II)

Points common to the preforms I and II will be explained below. The preforms I and II will be simply and collectively called "preform" hereinafter.

In the present invention, desirably, the preform is formed of a glass that absorbs near infrared light and has, as a transmittance characteristic, an external transmittance of at least 80% at a wavelength of 400 nm when it has a thickness of 1 mm, for obtaining a color-correcting optical element for a solid image-sensing device (e.g., an image sensing device of CCD type (Charge-Coupled-Device) or an image-sensing device of MOS type (Metal-Oxide-Semiconductor)). More desirably, it is formed of a glass having, as transmittance characteristics, an external transmittance of 80 to 90% at a wavelength of 400 nm, an external transmittance of 0.1 to 18% at a wavelength of 700 nm, an external transmittance of 1 to 30% at a wavelength of 1,200 nm and a maximum external transmittance at a wavelength of 400 to 600 nm when the glass has a thickness of 1 mm.

The above external transmittance refers to a ratio of the intensity of outgoing light to the intensity of incidence light ((outgoing light intensity/incidence light intensity)×100), when light is caused to vertically enter one of two plane-shaped optically polished surfaces of a glass which surfaces are in parallel with each other and is caused to exit from the other surface.

In the wavelength region of 280 to 1,200 nm, the external transmittance monotonously increases when and after the wavelength becomes longer than 280 nm, and after the external transmittance reaches 50%, it monotonously increases further to become a maximum value. Then, the external transmittance monotonously decreases to reach 50% again and decreases as well thereafter, and light in the near infrared region is absorbed. And, a low transmittance is maintained up to a wavelength of 1,200 nm. Therefore, it follows that the wavelength region of 280 to 1,200 nm includes two wavelengths at which the external transmittance becomes 50%. When a longer wavelength of these is taken as λ50, it is preferred for obtaining an excellent color-correcting optical element for a solid image-sensing device that λ50 is in the range of 580 to 640 nm.

Further, the preform is preferably formed of a glass having a refractive index (nd) of 1.52 to 1.7 and an Abbe's number (vd) in the range of 42 to 70.

For improving the precision press-moldability more, the preform is preferably formed of a glass having a glass transition temperature (Tg) of 560° C. or lower, it is more preferably formed of a glass having a glass transition temperature (Tg) of 500° C. or lower, and it is still more preferably formed of a glass having a glass transition temperature (Tg) of 450° C. or lower. As described already, the precision press-molding of a glass refers to a method in which a preform is molded under pressure at a high temperature with a press mold having a cavity having a predetermined form, to obtain a glass molded article having an end product form or a form very close thereto and having end product surface accuracy or surface accuracy very close thereto. According to the precision press-molding, molded articles having desired forms can be highly productively produced. It is therefore present practice to produce various optical glass parts such as a spherical lens, an aspherical lens, a diffraction grating, etc., by precision press-molding. For obtaining an optical element formed of a glass by precision press-molding, it is naturally required to press-mold a preform at a high temperature as described above, so that a press mold is exposed to high temperatures and that high pressures are applied thereto. It is therefore required to decrease the glass transition temperature of the preform for preventing damage that a high-temperature environment during the press-molding will cause a press mold itself and a mold release film provided to an internal surface (molding surface) of the mold. The preform of the present invention satisfies the above requirements and enables excellent precision press-molding.

For shaping the preform of the present invention from a molten glass, it is preferred to improve the glass in high-temperature stability. Particularly, for improving hot preform shapeability, it is desired to decrease the liquidus temperature (LT) of a glass for constituting the preform and bring the viscosity of the glass at the liquidus temperature to a range suitable for hot preform shaping. From the above viewpoint, it is preferred to adjust the above liquidus temperature (LT) of a glass to 900° C. or lower. It is also preferred to shape a preform from a glass that exhibits a viscosity of at least 4 dPa·s at the liquidus temperature. The viscosity of the glass at a liquidus temperature is preferably 4 to 100 dPa·s, more preferably 5 to 100 dPa·s, still more preferably 10 to 50 dPa·s.

As a process for shaping a preform all the surfaces of which are smooth and clean and have no scratches, a float-shaping process is very effective, in which a molten glass is caused to flow out of an outflow pipe, a molten glass gob equivalent to one preform is separated and the molten glass gob is shaped into a preform while it is caused to float by applying gas pressure to the molten glass gob. Further, the preform can be shaped in a form of a body of revolution such as a sphere or the like, which is advantageous for precision press-molding. While the float shaping has the above advantage, the viscosity of a glass at a liquidus temperature is required to be at least 4 dPa·s as a high-temperature working viscosity property of the glass that can be applied to the floating shaping. When a glass has the above viscosity property, all surfaces of a preform come to be formed by solidification of the glass in a molten state, and such a glass is advantageous for shaping the preform having free surfaces. When the viscosity of a glass at a liquidus temperature exceeds 100 dPa·s, it is attempted to increase the temperature further for decreasing the viscosity to shape a preform, and in this case, glass components are easily volatilized during the shaping, so that surface striae are liable to occur.

A preform of which all the surfaces are formed by solidification of a glass in a molten state or a preform of which all the surfaces are formed of free surfaces is remarkably superior as a precision press-molding preform, since all the surfaces are smooth, clean and free of no microscope polishing marks as explained already.

The method of separating a molten glass gob having a mass equivalent to the mass of a preform from an outflowing molten glass without using any cutting blade includes a method in which a molten glass is caused to drop from an outflow pipe in the form of a droplet, and a method in which a molten glass is caused to continuously flow out of an outflow pipe, a lower end of the molten glass flow is supported, a narrow portion is formed in a mid portion of the molten glass flow and the support is removed to separate a molten glass positioned below the narrow portion. The former method is called a dropping method, and the later is called a falling-separating method. In each method, when the viscosity of an outflowing glass increases too excess, it is difficult to separate a molten glass gob. On the other hand, when the viscosity of a glass at the liquidus temperature thereof is less than 4 dPa·s, it may be difficult to employ the dropping method. In both the dropping method and the falling-cutting method, preferably, the flow rate of a molten glass from the outflow pipe is adjusted to be constant, and the time interval of separating molten glass gobs is adjusted to be constant, for stably producing preforms having a constant mass each.

Further, concerning the water resistance of the glass for constituting the preform, preferably, the mass loss of the glass in a water resistance test (method of measuring an optical glass for chemical durability (powder method) JOGISO06-1999) according to Japan Optical Glass Industry Society Standard is 0.25 mass % or less. Concerning the climate resistance, further, when a glass having flat and optically polished surfaces that are in parallel with each other is held in a clean constant-temperature constant-humidity vessel having a temperature of 65° C. and a relative humidity of 90% for 7 days followed by transmitting of white light through the optically polished surfaces of the glass, preferably, the ratio of scattered light intensity/transmitted light intensity (to be referred to as "haze value") is desirably 0.05 or less, more desirably 0.04 or less. It can be considered that the scattered light intensity is obtained by deducting transmitted light intensity from incidence light intensity.

When the rate of corrosion of the preform surface with water drops or vapor and various chemical components in use environments such as a gas, etc., or formation of a reaction product is large, foreign matter is liable to be generated on the surface, and the optical properties such as a transmittance are degraded. When a coating such as an anti-reflection film or the like is formed on an optical-function surface, the degradation of the surface condition of an optical element can be prevented. When a preform is degraded in surface condition, the preform is already a defective product. The preform is therefore required to have the above chemical durability.

The preform surface may be provided with a film for improving lubricity between the preform surface and the surface of a press mold during precision press-molding or a mold release film for preventing adhesion of the preform to a press mold. Examples of such films include a carbon-containing film and a self-assembled monolayer. The carbon-containing film includes, for example, a vapor-deposited carbon film and a hydrogenated carbon film. Desirably, Such a film is formed on the entire surface of the preform or on that surface of the preform which comes in contact with a press mold.

The process for the production of a preform, provided by the present invention, comprises separating a molten glass gob having a constant mass from a molten glass and shaping the gob into the above preform. Such a preform can be produced by a method in which a homogenous optical glass block is formed, the block is cut after a strain in the block is removed, the block is machine-processed into the form of a preform and the surface thereof is optically polished. However, the above method requires much labor and a large cost and newly requires the step of machine-processing a preform instead of replacing the machine-processing of an optical element by precision press-molding, so that the industrial advantage of the precision press-molding is reduced. In contrast, according to the process for the production of a preform, provided by the present invention, there can be highly productively provided preforms that can be molded into optical elements having the property of absorbing near infrared light by precision press-molding.

In the process for the production of a preform, provided by the present invention, a molten glass is caused to flow out of an outflow pipe made, for example, of a platinum alloy at a constant rate, and preforms having high mass accuracy can be shaped by the already explained dropping method or falling-cutting method. The shaping of the preform by float-shaping is preferred as is already explained.

The optical element and the process for the production thereof will be explained below.

[Optical Element and Process for the Production Thereof]

The optical element of the present invention includes three embodiments, a first optical element, a second optical element and a third optical element.

The first optical element of the present invention is an optical element produced by precision press-molding the above preform or a preform produced by the above process for the production of a preform.

The second optical element of the present invention is an optical element that is a precision press-molded article and that is formed of a glass having a composition comprising, by mol %, 25 to 45% of $P_2O_5$, 0.5 to 10% of CuO, 0 to 10% of $B_2O_3$, 0 to 10% of $Al_2O_3$, 2 to 30% of $Li_2O$, 0 to 25% of $Na_2O$, 0 to 15% of $K_2O$, the total content of $Li_2O$, $Na_2O$ and $K_2O$ being 3 to 40%, 3 to 45% of BaO, 0 to 30% of ZnO, 0 to 20% of MgO, 0 to 20% of CaO, 0 to 20% of SrO, 0 to 10% of $Bi_2O_3$, 0 to 5% of $La_2O_3$, 0 to 5% of $Gd_2O_3$ and 0 to 5% of $Y_2O_3$, the total content of these components being at least 98%.

The optical element is formed of the above glass for the same reasons as those explained with regard to the preform I.

The third optical element of the present invention is an optical element that is a precision press-molded product and that is formed of a phosphate glass containing CuO, an alkali metal oxide, BaO and ZnO and having a BaO content/ZnO content molar ratio (BaO/ZnO) of greater than 1.

The optical element is formed of the above glass for the same reasons as those explained with regard to the preform II.

It is desirable that any one of the above optical elements desirably should have the property of absorbing near infrared light, so that they desirably have the light transmittance property that the preforms I and II have.

The above optical element includes, for example, an aspherical lens, a spherical lens, a lens array, a microlens, an optical low-pass filter, a diffraction grating, and the like. It may be an optical element having composite functions such as an aspherical lens having an optical low-pass filter function, a spherical lens having an optical low-pass filter function or a lens with a diffraction grating.

Further, having the function of absorbing near infrared light, the above optical element is effective as a color-correcting optical element for a solid image-sensing device such as a CCD type image-sensing device or MOS type image-sensing device.

The optical element surface may be provided with a multi-layered film or a single-layered film such as an anti-reflection film.

The process for the production of an optical element, provided by the present invention, will be explained below. The process for the production of an optical element, provided by the present invention, comprises heating the above preform or a preform produced by the process for the production of a preform and precision press-molding it with a press mold. The optical element of the present invention can be obtained by the above production process.

The press mold in a high-temperature state is handled in a non-oxidizing gas atmosphere. That is because it is required to prevent damage that is to be caused on the molding surface of the press mold by oxidation. The molding surface of the press mold is provided with a mold release film for preventing the adhesion of the glass to the mold. The mold release film can be selected from a carbon film, a noble metal alloy film such as a platinum alloy film or a noble metal film. When the film is damaged by oxidation, there is caused a problem that the adhesion of a glass takes place in a damaged portion or that the surface accuracy of an optical element is degraded. The precision press-molding is carried out in the atmosphere of a non-oxidizing gas such as nitrogen, a mixture gas of nitrogen and hydrogen, argon or other inert gas, whereby the above problem can be prevented.

The material for the press mold can be selected from known materials, and it can be selected from a refractory material such as a refractory metal, silicon carbide, or the like.

The process for the production of an optical element includes two embodiments. The first embodiment of the process comprises introducing a precision press-molding preform into a press mold and heating the preform and the press mold together to carry out precision press-molding. The second embodiment of the process comprises introducing a pre-heated precision press-molding preform into a press mold and precision press-molding it. The first embodiment requires many press molds for mass-producing optical elements since the preform and the press mold are heated together. However, the preform and the press mold are in a thermal equilibrium state or in a state close thereto, so that high-accuracy precision press-molding can be carried out. The second embodiment of the present invention enables the mass-production of optical elements with a relatively small number of press molds. While these two embodiments of the process have a common point in that high-accuracy optical elements can be obtained, it can be decided which one of the two embodiments should be employed depending upon whether or not priority is given to higher accuracy or depending upon whether or not priority is given to an improvement in mass-productivity with a smaller number of molds.

In the first embodiment of the process, preferably, the press mold and the preform are together heated to a temperature at which the glass shows a viscosity of $10^8$ to $10^{12}$ dPa·s. Further, desirably, the press mold and a molded product are cooled to a temperature at which the glass shows viscosity of at least $10^{12}$ dPa·s, more preferably at least $10^{14}$ dPa·s, still more preferably at least $10^{16}$ dPa·s, before the molded product is taken out of the press mold.

In the second embodiment of the process, desirably, the molded product is taken out of the press mold after the viscosity of the press-molded glass reaches $10^{12}$ dPa·s or more. Further, preferably, the preform is heated while it is caused to float, and the preform is introduced to the press mold. Desirably, the preform is introduced into the press mold after the preform is pre-heated until the glass shows, preferably, a viscosity of $10^9$ dPa·s or lower, more preferably a viscosity of $10^{5.5}$ to $10^9$ dPa·s. Further, it is desirable to start the cooling of the glass simultaneously with the initiation of the pressing or at some time during the pressing. The temperature for heating the press mold is preferably adjusted to a temperature at which the glass constituting the preform shows a viscosity of $10^9$ to $10^{12}$ dPa·s. In the second embodiment of the process, however, it is desirable that the temperature for heating the preform should be higher than the temperature for heating the press mold.

The molded product taken out of the press mold is annealed as required, and when the preform surface has a film provided, the film is removed.

Further, the molded product is processed for centering and edging as required, and various optical elements such as the optical element of the present invention having the property of absorbing near infrared light can be produced without carrying out the mechanical processing of the form of an optical-function surface.

EXAMPLES

The present invention will be explained more in detail with reference to Examples hereinafter, while the present invention shall not be limited by these Examples.

Example 1

Oxides, carbonates, sulfates, nitrates, phosphates, fluorides, hydroxides, etc., as raw materials for a glass were weighed in an amount of 250 to 300 g so as to obtain a glass composition having a predetermined amount ratio shown in Table 1, and these materials were fully mixed to obtain a formulated batch. The formulated batch was placed in a platinum crucible and melted in air with stirring at a temperature of 900 to 1,100° C. for 1 to 4 hours. After melted, a clarified and homogenized molten glass was cast into a 40×70×15 mm carbon mold and gradually cooled to a temperature around the glass transition temperature thereof, and immediately thereafter, the glass is placed in an annealing furnace and annealed around the glass transition temperature for about 1 hour to allow the glass to be cooled to room temperature. The thus-obtained optical glass was observed through an optical microscope to show no precipitation of a crystal.

Table 2 shows external transmittances (T400, T700 and T1200) at 400 nm, 700 nm and 1,200 nm, a maximum external transmittance (Tmax), λ50 and a glass transition temperature (Tg) of the above glass had.

For properties shown in Table 2, measurements were made as follows.

(1) Glass Transition Temperature (Tg) and Sag Temperature (Ts)

A sample was measured with a thermo-mechanical analyzer supplied by Rigaku Denki K.K. at a temperature elevation rate of 4° C./minute.

(2) External Transmittance (T400, T1200, T700 and λ50)

A polished glass having a thickness of 1.0±0.1 mm was measured for spectral transmittances (including a surface reflection loss) in a wavelength region of 280 nm to 1,200 nm. Concerning transmittances, T400, T700 and T1200 in Table 2 stand for transmittances at wavelengths of 400 nm, 700 nm and 1,200 nm, respectively, and λ50 stands for a wavelength at which the external transmittance reaches 50% on the longer wavelength side in the above wavelength region.

Figure 1:
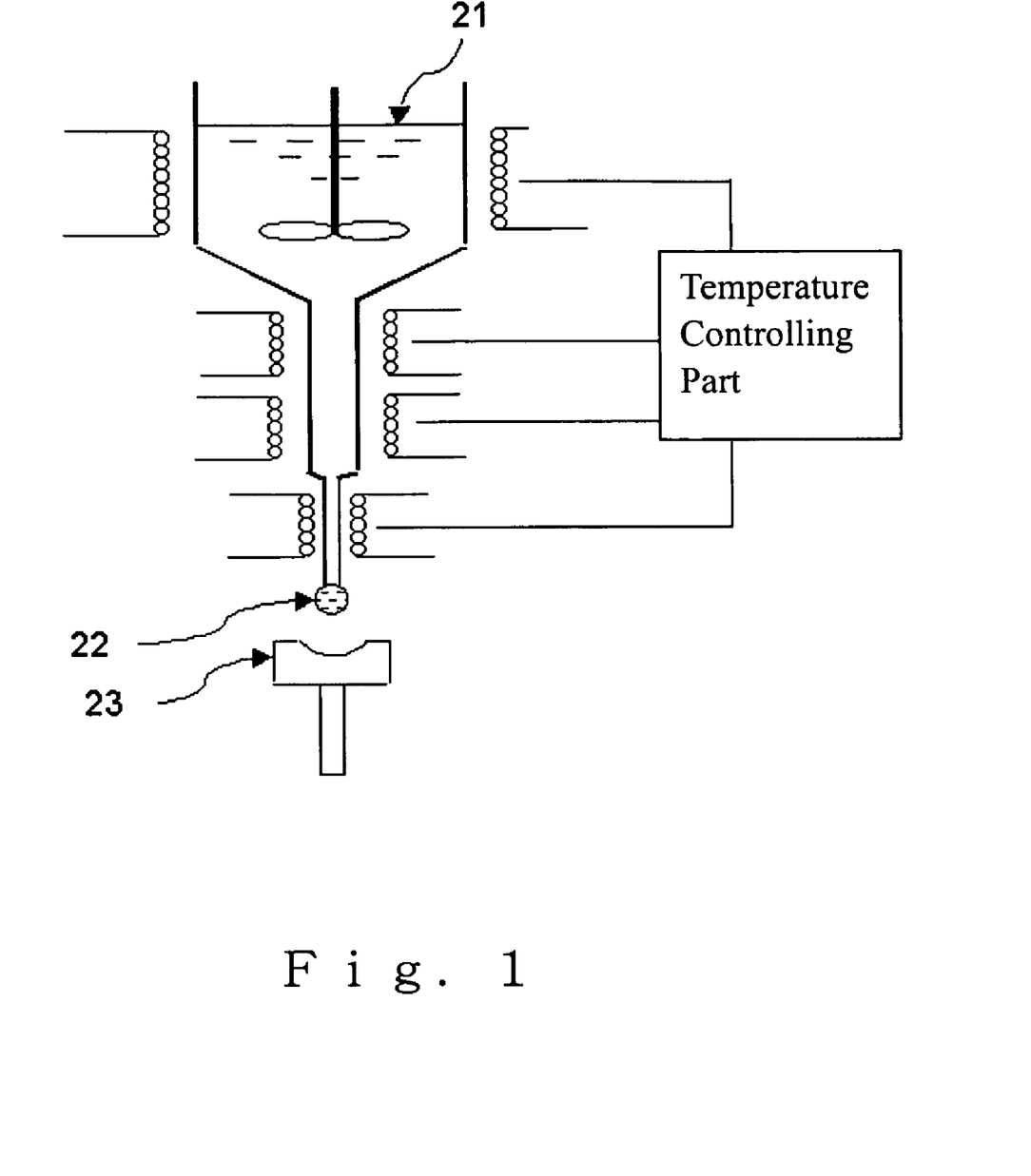
FIG. 1 is a schematic cross-sectional view of a hot preform float-shaping apparatus used in Example 1.

Glasses Nos. 1 to 16 and 18 in Tables 1 and 2 had a haze value of less than 0.04 (less than 4%), and a glass No. 17 had a haze value of 0.05 to 0.065 (5% to 6.5%).

mg can be produced. In FIG. 1, numeral 21 indicates a molten glass, 22 indicates a glass droplet, and 23 indicates a preform shaping mold.

TABLE 1

| No. | $P_2O_5$ | CuO | $B_2O_3$ | $Al_2O_3$ | $Li_2O$ | $Na_2O$ | $K_2O$ | $Li_2O + Na_2O + K_2O$ | BaO | ZnO | BaO/ZnO | MgO | CaO | SrO | $Bi_2O_3$ | $Gd_2O_3$ | Total |
|---|---|---|---|---|---|---|---|---|---|---|---|---|---|---|---|---|---|
| 1 | 34.5 | 2.50 | 2.5 | 1.0 | 10.0 | 10.0 | 4.5 | 24.5 | 20.0 | 12.5 | 1.6 | 2.5 | 0.0 | 0.0 | 0.0 | 0.0 | 100.0 |
| 2 | 34.5 | 2.50 | 2.5 | 1.0 | 10.0 | 10.0 | 4.5 | 24.5 | 20.0 | 10.0 | 2.0 | 5.0 | 0.0 | 0.0 | 0.0 | 0.0 | 100.0 |
| 3 | 34.5 | 2.50 | 2.5 | 1.0 | 10.0 | 10.0 | 4.5 | 24.5 | 20.0 | 5.0 | 4.0 | 10.0 | 0.0 | 0.0 | 0.0 | 0.0 | 100.0 |
| 4 | 34.5 | 2.50 | 2.5 | 1.0 | 10.0 | 10.0 | 4.5 | 24.5 | 20.0 | 12.5 | 1.6 | 0.0 | 2.5 | 0.0 | 0.0 | 0.0 | 100.0 |
| 5 | 34.5 | 2.50 | 2.5 | 1.0 | 10.0 | 10.0 | 4.5 | 24.5 | 20.0 | 10.0 | 2.0 | 0.0 | 5.0 | 0.0 | 0.0 | 0.0 | 100.0 |
| 6 | 34.5 | 2.50 | 2.5 | 1.0 | 10.0 | 10.0 | 4.5 | 24.5 | 20.0 | 5.0 | 4.0 | 0.0 | 10.0 | 0.0 | 0.0 | 0.0 | 100.0 |
| 7 | 34.5 | 2.50 | 2.5 | 1.0 | 10.0 | 10.0 | 4.5 | 24.5 | 20.0 | 12.5 | 1.6 | 0.0 | 0.0 | 2.5 | 0.0 | 0.0 | 100.0 |
| 8 | 34.5 | 2.50 | 2.5 | 1.0 | 10.0 | 10.0 | 4.5 | 24.5 | 20.0 | 10.0 | 2.0 | 0.0 | 0.0 | 5.0 | 0.0 | 0.0 | 100.0 |
| 9 | 34.5 | 2.50 | 2.5 | 1.0 | 10.0 | 10.0 | 4.5 | 24.5 | 20.0 | 10.0 | 2.0 | 0.0 | 5.0 | 0.0 | 0.0 | 0.0 | 100.0 |
| 10 | 34.5 | 2.50 | 2.5 | 1.0 | 10.0 | 10.0 | 4.5 | 24.5 | 21.5 | 8.5 | 2.5 | 0.0 | 5.0 | 0.0 | 0.0 | 0.0 | 100.0 |
| 11 | 34.5 | 2.50 | 1.0 | 1.0 | 10.0 | 10.0 | 4.5 | 24.5 | 20.0 | 11.5 | 1.7 | 0.0 | 5.0 | 0.0 | 0.0 | 0.0 | 100.0 |
| 12 | 34.5 | 2.50 | 2.5 | 0.0 | 10.0 | 10.0 | 4.5 | 24.5 | 20.0 | 10.0 | 2.0 | 0.0 | 5.0 | 0.0 | 1.0 | 0.0 | 100.0 |
| 13 | 34.5 | 2.50 | 2.5 | 1.0 | 10.0 | 10.0 | 4.5 | 24.5 | 20.0 | 5.0 | 4.0 | 5.0 | 5.0 | 0.0 | 0.0 | 0.0 | 100.0 |
| 14 | 34.5 | 2.50 | 2.5 | 1.0 | 10.0 | 7.5 | 2.0 | 19.5 | 20.0 | 10.0 | 2.0 | 0.0 | 10.0 | 0.0 | 0.0 | 0.0 | 100.0 |
| 15 | 36.0 | 2.50 | 1.0 | 1.0 | 10.0 | 10.0 | 2.0 | 22.0 | 20.0 | 10.0 | 2.0 | 0.0 | 7.5 | 0.0 | 0.0 | 0.0 | 100.0 |
| 16 | 36.0 | 2.50 | 1.0 | 1.0 | 10.0 | 10.0 | 4.5 | 24.5 | 20.0 | 10.0 | 2.0 | 0.0 | 5.0 | 0.0 | 0.0 | 0.0 | 100.0 |
| 17 | 36.0 | 2.50 | 1.5 | 0.0 | 12.4 | 10.4 | 4.0 | 26.8 | 23.0 | 9.5 | 2.4 | 0.0 | 0.0 | 0.0 | 0.7 | 0.0 | 100.0 |
| 18 | 37.9 | 2.60 | 1.8 | 1.8 | 5.4 | 0.0 | 0.0 | 5.4 | 36.1 | 3.6 | 10.0 | 7.2 | 3.6 | 0.0 | 0.0 | 0.0 | 100.0 |

(Note 1)
$Li_2O + Na_2O + K_2O$ stands for a total content of these three components.
(Note 2)
BaO/ZnO stands for a value obtained by dividing a BaO content expressed by mol % with a ZnO content expressed by mol %.

TABLE 2

| | Properties | | | | |
|---|---|---|---|---|---|
| No. | GTT (° C.) | T400 (%) | Tmax (%) | λ50 (nm) | T700 (%) | T1200 (%) |
| 1 | 355 | 86.8 | 89.2 | 596 | 2.3 | 9.3 |
| 2 | 363 | 86.9 | 89.1 | 596 | 2.2 | 8.5 |
| 3 | 381 | 85.7 | 87.8 | 594 | 1.9 | 9.4 |
| 4 | 352 | 86.7 | 89.2 | 598 | 2.5 | 9.7 |
| 5 | 355 | 86.4 | 88.5 | 597 | 2.4 | 9.5 |
| 6 | 368 | 86.3 | 88.9 | 597 | 2.4 | 9.1 |
| 7 | 354 | 87 | 89.3 | 597 | 2.4 | 9.6 |
| 8 | 357 | 86.1 | 88.3 | 597 | 2.4 | 9.7 |
| 9 | 355 | 86.4 | 88.5 | 597 | 2.4 | 9.5 |
| 10 | 358 | 86.6 | 88.9 | 597 | 2.2 | 8.8 |
| 11 | 349 | 86.6 | 88.8 | 598 | 2.4 | 9.1 |
| 12 | 354 | 86.7 | 88.9 | 597 | 2.3 | 9.1 |
| 13 | 374 | 86.7 | 88.9 | 594 | 2.1 | 8.4 |
| 14 | 379 | 87 | 89.1 | 595 | 2.2 | 9.1 |
| 15 | 350 | 87.3 | 89.2 | 603 | 3.3 | 10.4 |
| 16 | 343 | 87.5 | 89.3 | 603 | 3.2 | 9.4 |
| 17 | 327 | 86.4 | 89.2 | 605 | 3.5 | 10.3 |
| 18 | 487 | 86.7 | 88.7 | 621 | 11.6 | 21.5 |

GTT = Glass transition temperature

It is seen from Table 2 that the optical glasses in Examples have properties excellent as a material for precision press-molding for producing near infrared light absorbing elements.

FIG. 1 is a schematic cross-sectional view of a hot preform float-shaping apparatus, and the glasses shown in Tables 1 and 2 were shaped into spherical preforms having diameters of 2 to 30 mm by a dropping method using the hot preform float-shaping apparatus shown in FIG. 1. The thus-obtained preforms had a mass accuracy of within ±1%. In this manner, spherical preforms having predetermined masses of 5 to 600

Further, a molten glass gob is separated by a falling-cutting method and floating-shaped into a preform, whereby there can be produced the preform that has a predetermined mass of 100 mg to 10 g with a mass accuracy of within ±2%.

Preforms shaped in the above manner had all the surfaces formed by solidification of a glass in a molten state, and the preforms were formed of free surfaces. In this manner, there were produced spherical preforms and preforms having a form close to an ellipsoid of revolution having one axis of symmetrical revolution.

Example 2

Figure 2:
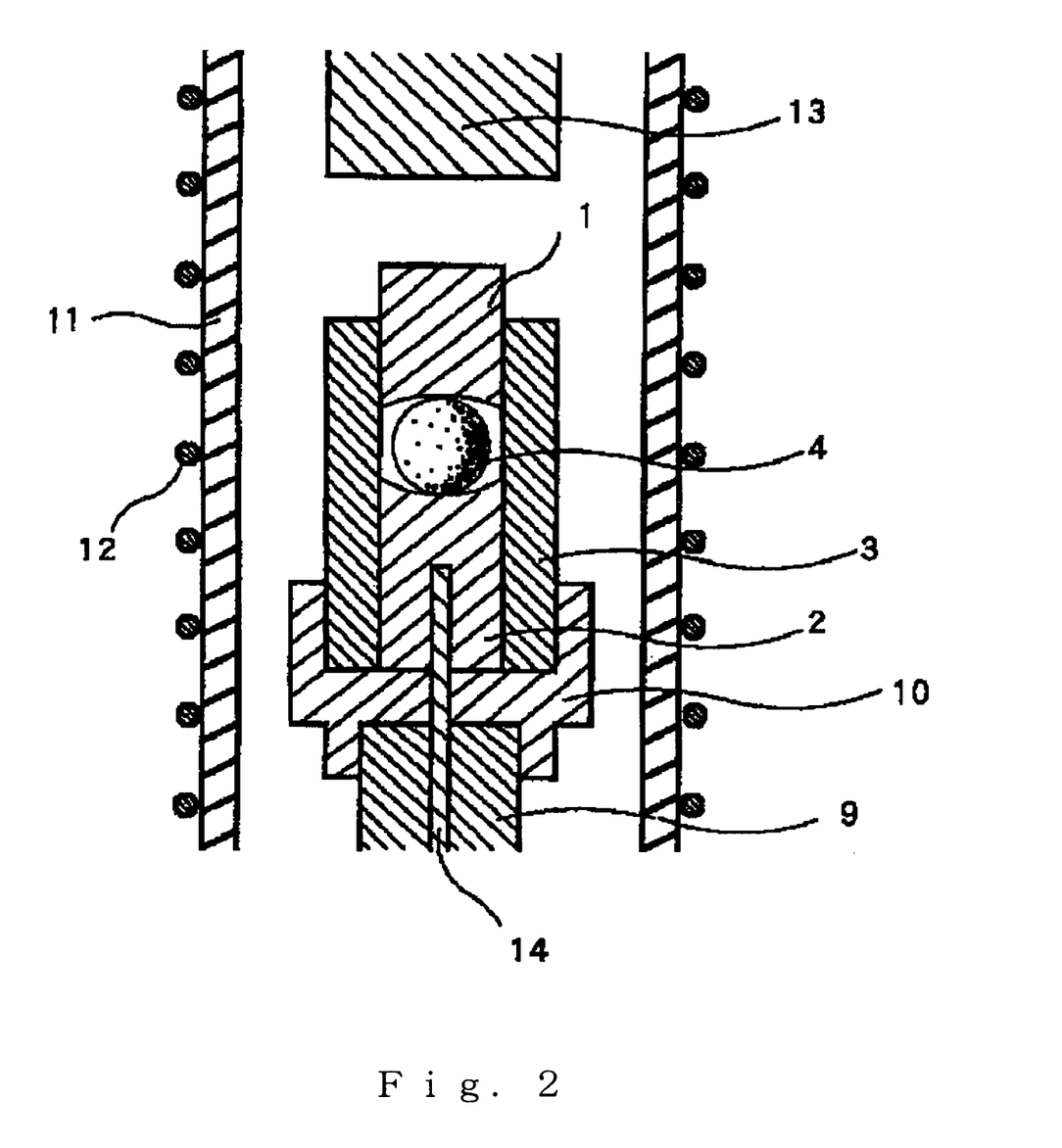
FIG. 2 is a schematic cross-sectional view of a precision press-molding apparatus used in Examples.
Figure 3:
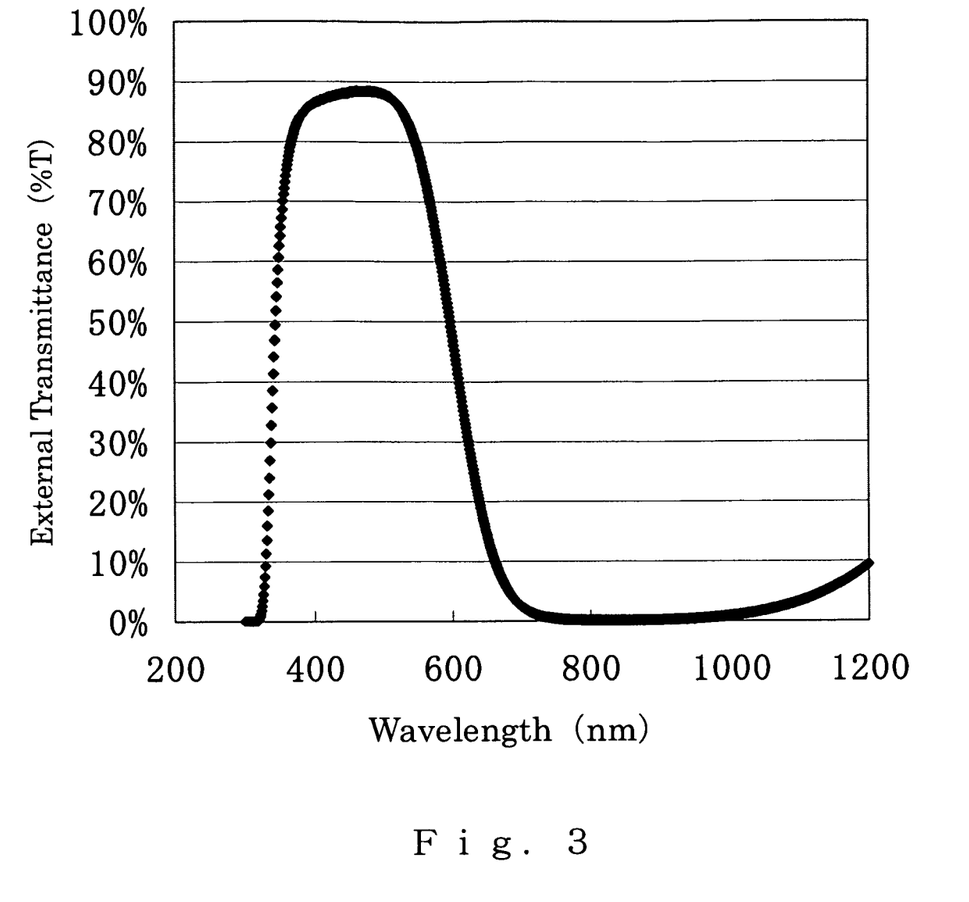
FIG. 3 is a chart of an external transmittance curve of a glass constituting a No. 9 preform in Example 1 when the glass has a thickness of 1 mm.

FIG. 2 shows a schematic cross-sectional view of a precision press-molding apparatus. A preform 4 that was obtained in the same manner as in Example 1 was placed between a lower mold member 2 and an upper mold member 1 of the precision press-molding apparatus shown in FIG. 2, and the atmosphere in a quartz tube 11 was replaced with a nitrogen atmosphere. A heater 12 was electrically powered to heat the quartz tube 11 internally. The temperature of the heater 12 was set such that the temperature inside a press mold was higher than the sag temperature of the glass by 20 to 60° C., and while the temperature was maintained, a pressing rod 13 was caused to move downward to press the upper mold member 1, so that the preform in the mold was precision press-molded. The molding pressure was adjusted to 8 MPa, and the molding time period was adjusted to 30 seconds. After the pressing, the molding pressure was decreased, and while the mold product was in a state where it was in contact in the lower mold member 2 and the upper mold member 1, the molded product was gradually cooled to a temperature lower than the glass transition temperature by 30° C. Then, the molded product was sharply cooled to room temperature and then taken out of the mold. Aspherical lenses obtained from the preforms in Example 1 in the above manner were highly accurate optical lenses. FIG. 3 shows a chart of external transmittance of the glass constituting the preform No. 9 in Example 1 when the glass had a thickness of 1 mm. In FIG. 2, numeral 3 indicates a sleeve, 9 indicates a supporting rod, 10 indicates a support bed, and 14 indicates a thermocouple.

INDUSTRIAL UTILITY

The precision press-molding preform, provided by the present invention, is excellent in precision press-moldability and durability and enables the stable production of various optical elements such as an aspherical lens, a spherical lens, a lens array, and the like which have the property of excellently absorbing near infrared light.

The invention claimed is:

1. A precision press-molding preform having a haze value of 0.04 or less, which is formed of a glass composition comprising, by mol %, 25 to 45% of $P_2O_5$, 0.5 to 10% of CuO, 0 to 10% of $B_2O_3$, 0 to 10% of $Al_2O_3$, 2 to 24.5% of $Li_2O$, 0 to 22.5 of $Na_2O$, 0 to 15% of $K_2O$, 3 to 45% of BaO, 0 to 30% of ZnO, 0 to 20% of MgO, 0 to 20% of CaO, 0 to 20% of SrO, 0 to 5% of $La_2O_3$, 0 to 5% of $Gd_2O_3$ and 0 to 5% of $Y_2O_3$, the total content of $P_2O_5$, CuO, $B_2O_3$, $Al_2O_3$, $Li_2O$, $Na_2O$, $K_2O$, BaO, ZnO, MgO, CaO, SrO, $La_2O_3$, $Gd_2O_3$ and $Y_2O_3$ being at least 99%, the total content of $Li_2O$, $Na_2O$ and $K_2O$ being 3 to 24.5%, and the glass composition being free of $Bi_2O_3$.

2. A precision press-molding preform as recited in claim 1, wherein the glass composition has a BaO content/ZnO content molar ratio (BaO/ZnO) of greater than 1.

3. A precision press-molding preform as recited in claim 1 or 2, wherein the glass, when it has a thickness of 1 mm, has, as transmittance characteristics, an external transmittance of 80 to 90% at a wavelength of 400 nm, an external transmittance of 0.1 to 18% at a wavelength of 700 nm, an external transmittance of 1 to 30% at a wavelength of 1,200 nm and a maximum external transmittance at a wavelength of 400 to 600 nm.

4. A process for the production of a precision press-molding preform, which comprises separating a molten glass gob having a predetermined mass from a molten glass and shaping the molten glass gob into the precision press-molding preform recited in claim 1 or 2.

5. An optical element which is a precision press-molded product from the precision press-molding preform recited claim 1 or 2.

6. An optical element which is a precision press-molded product from that precision press-molding preform which is produced by the process recited in claim 4.

7. An optical element having a haze value of 0.04 or less which is a precision press-molded product and is formed of a glass composition comprising, by mol %, 25 to 45% of $P_2O_5$, 0.5 to 10% of CuO, 0 to 10% of $B_2O_3$, 0 to 10% of $Al_2O_3$, 2 to 24.5% of $Li_2O$, 0 to 22.5 of $Na_2O$, 0 to 15% of $K_2O$, 3 to 45% of BaO, 0 to 30% of ZnO, 0 to 20% of MgO, 0 to 20% of SrO, 0 to 5% of $La_2O_3$, 0 to 5% of $Gd_2O_3$ and 0 to 5% of $Y_2O_3$, the total content of $P_2O_5$, CuO, $B_2O_3$, $Al_2O_3$, $Li_2O$, $Na_2O$, $K_2O$, BaO, ZnO, MgO, CaO, SrO, $La_2O_3$, $Gd_2O_3$ and $Y_2O_3$ being at least 99%, the total content of $Li_2O$, $Na_2O$ and $K_2O$, being 3 to 24.5% and the glass composition being free of $Bi_2O_3$.

8. An optical element as recited in claim 7 which is formed of a phosphate glass containing CuO, an alkali metal oxide, BaO and ZnO and having a BaO content/ZnO content molar ratio (BaO/ZnO) of greater than 1.

9. An optical element as recited in claim 5, which is one of an aspherical lens, a spherical lens, a lens array, an optical low-pass filter and a diffraction grating, and has a near infrared absorbing function.

10. A process for the production of an optical element, which comprises heating the precision press-molding preform recited in claim 1 or 2 and precision press-molding the preform by means of a press mold.

11. A process for the production of an optical element, which comprises heating that precision press-molding preform produced by the process recited in claim 4 and precision press-molding the preform by means of a press mold.

12. A process for the production of an optical element as recited in claim 10, wherein the precision press-molding preform is introduced into the press mold, and the preform and the press mold are heated together for the precision press-molding.

13. A process for the production of an optical element as recited in claim 10, wherein the precision press-molding preform is pre-heated and then introduced into the press mold for precision press-molding.

* * * * *